United States Patent
Zhou et al.

(10) Patent No.: US 10,911,914 B2
(45) Date of Patent: Feb. 2, 2021

(54) AGGREGATING RECEIVED DATA

(71) Applicants: Huawei Technologies Co., Ltd., Shenzhen (CN); Fraunhofer-Gesellschaft zur Förderung der angewandten Forschung e. V., Munich (DE)

(72) Inventors: Chan Zhou, Munich (DE); Alexandros Kaloxylos, Munich (DE); Jan Schreck, Munich (DE); Slawomir Stanczak, Munich (DE); Peter Jung, Munich (DE); Miruna Raceala-Motoc, Munich (DE)

(73) Assignees: Huawei Technologies Co., Ltd., Shenzhen (CN); Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 15 days.

(21) Appl. No.: 16/287,702

(22) Filed: Feb. 27, 2019

(65) Prior Publication Data
US 2019/0261146 A1 Aug. 22, 2019

Related U.S. Application Data

(63) Continuation of application No. PCT/EP2016/070466, filed on Aug. 31, 2016.

(51) Int. Cl.
*H04W 4/00* (2018.01)
*H04W 4/40* (2018.01)
(Continued)

(52) U.S. Cl.
CPC ............ *H04W 4/40* (2018.02); *H04B 17/336* (2015.01); *H04L 1/0026* (2013.01); *H04L 25/03* (2013.01);
(Continued)

(58) Field of Classification Search
CPC ..... H04B 17/336; H04L 1/0026; H04L 25/03; H04W 4/025; H04W 4/40; H04W 74/0808
See application file for complete search history.

(56) References Cited

U.S. PATENT DOCUMENTS

| | | |
|---|---|---|
| 2007/0217533 A1 | 9/2007 | Hwang et al. |
| 2014/0004865 A1* | 1/2014 | Bhargava ............ H04W 40/12 455/445 |

OTHER PUBLICATIONS

Wei et al.,"Compute-and-Forward Network Coding Design over Multi-Source Multi-Relay Channels," IEEE Transactions on Wireless Communications, IEEE Service Center,Piscataway,NJ, US, vol.11, No. 9, XP011463440, pp. 1-10, Institute of Electrical and Electronics Engineers—New York, New York (Sep. 1, 2012).

(Continued)

*Primary Examiner* — Minh Trang T Nguyen
(74) *Attorney, Agent, or Firm* — Leydig, Voit & Mayer, Ltd.

(57) ABSTRACT

A method for estimating transmitted signals transmitted from a plurality of transmitters, the method comprising: simultaneously receiving at each of a plurality of receivers a respective received signal resulting from the transmitted signals; determining for each receiver a set of equation coefficients; forming for each received signal a characterisation of that received signal composed of elements weighted in accordance with the equation coefficients determined for the receiver at which that received signal was received; and processing the characterisations to estimate the transmitted signals; wherein the equation coefficients are determined such that the characterisations are substantially linearly independent.

19 Claims, 3 Drawing Sheets

(51) Int. Cl.
*H04B 17/336* (2015.01)
*H04L 1/00* (2006.01)
*H04W 4/02* (2018.01)
*H04W 74/08* (2009.01)
*H04L 25/03* (2006.01)

(52) U.S. Cl.
CPC ....... *H04W 4/025* (2013.01); *H04W 74/0808* (2013.01)

(56) References Cited

OTHER PUBLICATIONS

Dawy et al.,"Towards Massive Machine Type Cellular Communications," IEEE Wireless Communications Magazine, pp. 1-9, Institute of Electrical and Electronics Engineers—New York, New York (Feb. 2017).

Calvante et al.,"Toward Energy-Efficient 5G Wireless Communications Technologies," IEEE Signal Processing Magazine, vol. 31, pp. 1-11, Institute of Electrical and Electronics Engineers—New York, New York (Nov. 2014).

Paolini, Enrico; Liva, Gianluigi; Chiani, Marco. High throughput random access via codes on graphs: Coded slotted ALOHA. In: Communications (ICC), 2011 IEEE International Conference on. IEEE, 2011. total 6 pages.

Abramson, Norman. The ALOHA System: another alternative for computer communications. In: Proceedings of the Nov. 17-19, 1970, fall joint computer conference. ACM, 1970. total 6 pages.

Wei et al,"Compute-and-Forward Network Coding Design over Multi-Source Multi-Relay Channels," IEEE Transactions on Wireless Communications, IEEE Service Center,Piscataway,NJ, US, vol. 11, No. 9, XP011463440, pp. 1-10, Institute of Electrical and Electronics Engineers—New York, New York (Sep. 1, 2012).

Aguerri et al, "Compute-Remap-Compress-and-Forward for Limited Backhaul Uplink Multicell Processing," 2016 IEEE International Conference on Communications, IEEE, XP032921870, pp. 1-6, Institute of Electrical and Electronics Engineers—New York, New York (May 22, 2016).

Ordentlich et al, "Practical Code Design for Compute-and-Forward," 2011 IEEE International Symposium on Information Theory Proceedings (ISIT 2011); St. Petersburg, Russia, IEEE, Piscataway, NJ , Jul. 31, 2011, XP031971540, pp. 1-6, Institute of Electrical and Electronics Engineers—New York, New York (Jul. 31-Aug. 5, 2011).

Zhan et al., "MIMO Compute-and-Forward," Information Theory, 2009 ISIT 2009, IEEE International Symposium on, IEEE, Piscataway, NJ, USA, XP031512989, pp. 1-6, Institute of Electrical and Electronics Engineers—New York, New York (Jun. 28, 2009).

Shariatmadari et al., "Machine-Type Communications: Current Status and Future Perspectives Toward 5G Systems," IEEE Communications Magazine, pp. 1-22, Aalto University, Institute of Electrical and Electronics Engineers—New York, New York (2015).

"5G: Personal Mobile Internet beyond What Cellular Did to Telephony," 5G Wireless Communication Systems: Prospects and Challenges, IEEE Communications Magazine, vol. 52, pp. 140-145, Institute of Electrical and Electronics Engineers—New York, New York (Feb. 2014).

Dawy et al.,"Toward Massive Machine Type Cellular Communications," IEEE Wireless Communications Magazine, pp. 1-9, Institute of Electrical and Electronics Engineers—New York, New York (Feb. 2017).

Chang et al., "Throughput Scaling for Random Hybrid Wireless Networks with Physical-Layer Network Coding," Proc. IEEE Information Theory Workshop (ITW), pp. 1-5, Institute of Electrical and Electronics Engineers—New York, New York (2015).

Cavalcante et al., "Toward Energy-Efficient 5G Wireless Communications Technologies," IEEE Signal Processing Magazine, vol. 31, pp. 1-11, Institute of Electrical and Electronics Engineers—New York, New York (Nov. 2014).

Bhushan et al., "Network Densification: The Dominant Theme for Wireless Evolution into 5G," IEEE Communications Magazine, vol. 52, pp. 1-8, Institute of Electrical and Electronics Engineers—New York, New York (2014).

Nazer et al., "Compute-and-Forward: Harnessing Interference Through Structured Codes," IEEE Transactions on Information Theory, vol. 57, pp. 1-24, IEEE Transactions on Information Theory, Institute of Electrical and Electronics Engineers—New York, New York (Oct. 10, 2011).

\* cited by examiner

AGGREGATING RECEIVED DATA

CROSS-REFERENCE TO RELATED APPLICATIONS

This application is a continuation of International Application No. PCT/EP2016/070466, filed on Aug. 31, 2016, the disclosure of which is hereby incorporated by reference in its entirety.

TECHNICAL FIELD

This disclosure relates to a method of aggregating received data as collected at multiple receivers so as to infer originally transmitted data.

BACKGROUND

Future applications of mobile communications technology are anticipated to involve transmitting devices that are numerous and highly mobile. Examples of such applications include vehicle-to-vehicle and vehicle-to-infrastructure communications as might be used in autonomous driving, platooning and road pricing. Road vehicles moving on a roadway may communicate with each other or with infrastructure such as receivers along the roadway so as to send information such as their positions, speeds, headway to the vehicle in front and intended manoeuvres. In order for this data to be carried with satisfactory reliability, the communications protocol used should provide good reliability, low delay and accommodate a high degree of mobility of vehicle-borne transmitters.

FIG. 1 illustrates schematically the architecture of a communications system. The system comprises a number of vehicles 1 moving on a roadway 2. Along the roadway there are fixed road-side transceiver units 3. These may be termed pico base stations. The transceiver units 3 communicate with a control unit 4 which may be termed an aggregator. The aggregator 4 communicates with a server 5. Each vehicle 1 comprises a transceiver which can communicate wirelessly with the pico base stations 3 using a radio protocol. In operation, each vehicle may gather information on its status: for example its position, speed, headway to the vehicle in front and intended manoeuvres. That information is then transmitted by the vehicle. The resulting transmission may be received by one or more of the pico base stations. Data received by the pico base stations is forwarded to the aggregator 4, which aggregates it to infer the transmitted data. Once the aggregator 4 has inferred the transmitted data it can forward it to the server 5. The server may then send control messages back to the vehicles by the opposite route, for example to invite the vehicles to speed up, slow down or change route.

One problem in designing a protocol for a system of this nature are that when the number of user devices (i.e. the transceivers in the vehicles) is large there can be a significant signalling overhead in coordinating transmissions between the devices so as to reduce the likelihood of collisions.

One technology proposed for a system of this nature is CSMA (carrier sense multiple access). This involves sensing the wireless channel and timing transmissions accordingly so as to reduce the probability of signal collisions. One problem with this is that it can introduce delays if channels are occupied. In an automated vehicle application these delays may have an impact on safety. Also, CSMA can require frequent handovers of user devices between infrastructure receivers.

Another technology proposed for a system of this nature is the LTE RACH (Long Term Evolution random access channel). This has the problems that significant signalling overhead is needed to establish an RACH connection, signal collisions may not be resolved, and significant latency may be incurred.

Another technology that could be considered is coded slotted ALOHA. Slotted ALOHA is a well-known scheme for timing communication transmissions. In the standard slotted ALOHA scheme signal collisions can occur, and if necessary messages are retransmitted. In coded slotted ALOHA each transmitter transmits multiple replicas of a message on different time slots. The transmissions from different transmitters may collide with each other. After the resulting signals are received, a successive interference cancellation step is performed. That step allows some messages to be decoded even if they collided with other messages. Coded slotted ALOHA is described in "High Throughput Random Access via Codes on Graphs: Coded Slotted ALOHA", Paolini et al., IEEE International Conference on Communications (ICC), 2011, IEEE 2011, S 1-6.

SUMMARY

There is a need for an improved communications protocol.

According to one aspect there is provided a method for estimating transmitted signals transmitted from a plurality of transmitters, the method comprising: simultaneously receiving at each of a plurality of receivers a respective received signal resulting from the transmitted signals; determining for each receiver a set of equation coefficients; forming for each received signal a characterisation of that received signal composed of elements weighted in accordance with the equation coefficients determined for the receiver at which that received signal was received; and processing the characterisations to estimate the transmitted signals; wherein the equation coefficients are determined such that the characterisations are substantially linearly independent. This method may allow signals to be independently estimated when they were received simultaneously by multiple receivers.

The transmitted signals may be transmitted on physical and/or logical channels. The channels may extend between respective transmitters and receivers. The said determining step may comprise: receiving channel information representing the performance of one or more of the channels; determining for each receiver a candidate set of equation coefficients in dependence on the channel information; and selecting for each receiver the set of equation coefficients from among the candidate set of equation coefficients. By determining the set of equation coefficients in dependence in the channel information the equation coefficients may be better suited for estimation of the channels.

The channel information may be gathered at one or more of the transmitters, and/or or at one or more of the receivers. This may provide a representative estimate of channel performance.

The method may comprise storing an indication of the channel information for a first time; receiving channel information for a second time subsequent to the first time; estimating the extent of deviation of the channel information received at the second time from the channel information at the first time; and determining in dependence on that extent of deviation whether to determine for each receiver a candidate set of equation coefficients in dependence on the channel information for the second time. This may help to avoid updating the coefficients too often.

The said selecting step may comprise: estimating for each receiver a computation rate for two or more of the candidate equation coefficients; and selecting the set of equation coefficients for each receiver in dependence on the estimated computation rates. This may help the transmitted signals to be estimated efficiently.

The method may comprise transmitting an indication of the estimated computation rates to the transmitters. The method may further comprise selecting a data rate for the transmitted signals in dependence on the estimated computation rates; and transmitting the transmitted signals at a data rate not exceeding the selected data rate. This can help to have the signals transmitted at a relatively high but recoverable data rate.

The method may comprise selecting for each receiver the set of equation coefficients of those determined for that receiver that have the greatest estimated computation rate. This may help the transmitted signals to be estimated efficiently.

There may be a controller remote from at least one of the receivers. The step of determining for each receiver a candidate set of equation coefficients is performed at the controller. This may provide a convenient network architecture for distributed processing.

The step of processing the characterisations to estimate the transmitted signals may be performed at the controller. This may provide a convenient network architecture for distributed processing.

The step of selecting for each receiver the set of equation coefficients from among the candidate set of equation coefficients may be performed at the respective receiver. This may provide a convenient network architecture for distributed processing.

The method may comprise transmitting the selected coefficients to the controller. Then the controller can take the coefficients into account when estimating the transmitted signal.

A transmitter may be configured to transmit a message simultaneously on multiple physical and/or logical channels. The method may comprise: determining for a receiver a set of equation coefficients for each of the multiple channels; forming for each signal received on a respective one of the multiple channels a characterisation of that received signal composed of factors weighted in accordance with the equation coefficients determined for the respective channel; estimating for each of the multiple channels a computation rate for the equation coefficients selected for that channel; selecting the channel whose equation coefficients yield the highest computation rate; forming for the signal received on the selected channel a characterisation of that received signal based on a weighted combination of the equation coefficients selected for the respective channel; and processing that characterisation to estimate the transmitted signal. This may allow for efficient use of network resources.

The method may comprise, at the said receiver: (i) forming for the signals received on each of the multiple channels a characterisation of that received signal composed of factors weighted in accordance with the equation coefficients determined for the respective channel; and (ii) estimating for each of the multiple channels a computation rate for the equation coefficients selected for that channel; transmitting the characterisations and the estimated computation rates to a processing unit remote from the receiver; and at the processing unit: (i) selecting the channel whose equation coefficients yield the highest computation rate and (ii) processing that characterisation to estimate the transmitted signal. This may allow the recovery of the transmitted signal to be performed efficiently.

According to another aspect there is provided a communications network comprising one or more network elements configured to perform the steps of: transmitting signals transmitted from a plurality of transmitters; simultaneously receiving at each of a plurality of receivers a respective received signal resulting from the transmitted signals; determining for each receiver a set of equation coefficients; forming for each received signal a characterisation of that received signal composed of factors weighted in accordance with the equation coefficients determined for the respective channel; processing the characterisations to estimate the transmitted signals; wherein the equation coefficients are determined such that the characterisations are substantially linearly independent.

The transmitters may be mobile transmitters, for example vehicle-borne transmitters. The signal transmitted from a transmitter borne by a vehicle comprises information indicative of the operational state of the vehicle. The signal transmitted from a transmitter borne by a vehicle comprises information indicative of the location of the vehicle. These features may be particularly advantageous in automated vehicle applications.

BRIEF DESCRIPTION OF DRAWINGS

Embodiments of the present invention will now be described by way of example with reference to the accompanying drawings.

In the drawings.

DETAILED DESCRIPTION OF EMBODIMENTS

Figure 1:
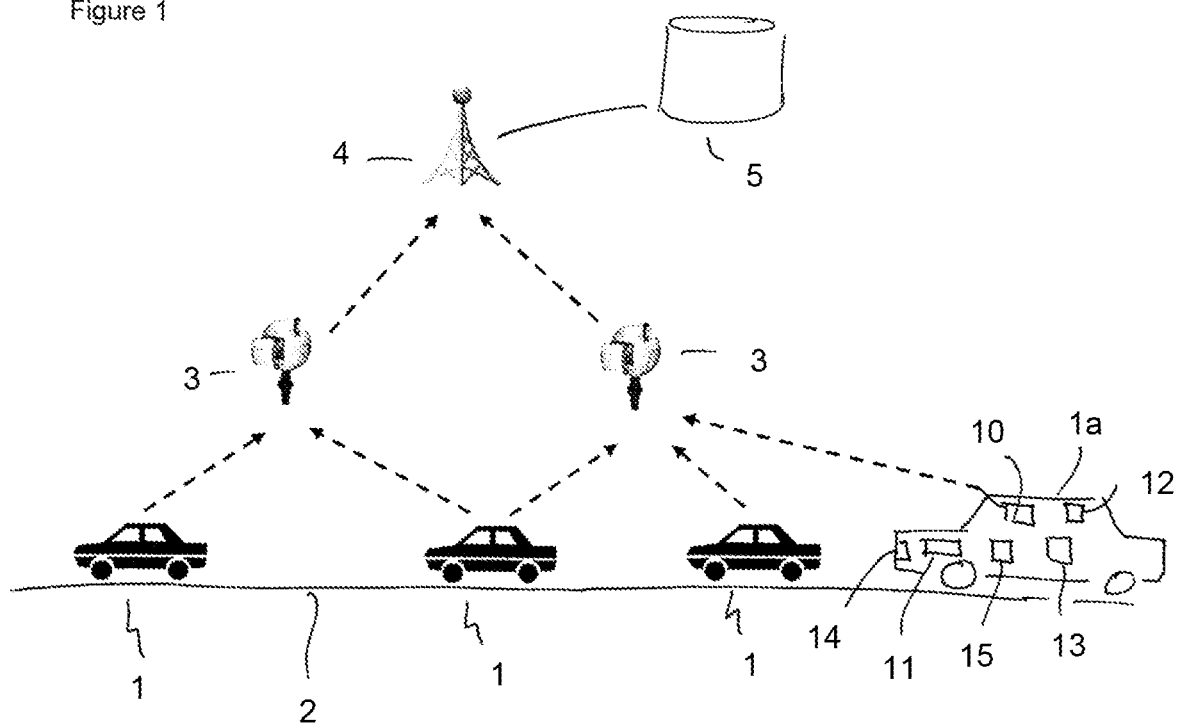
FIG. 1 shows schematically the architecture of a communications system.

The system to be described below may be used in a physical architecture as illustrated in FIG. 1. Vehicle 1a of FIG. 1 is enlarged to show that it carries a transceiver 10 which communicates with the vehicle's on-board motive control systems such as its powertrain (including an engine/motor) 11, a satellite positioning unit 12, a navigation unit 13 for determining a route, proximity sensors 14 and a steering unit 15. Data indicating the status of those systems can be transmitted by the transceiver 10 to one or more of the pico base stations 3 for forwarding to the server 5. The server 5 may cause the pico base stations 3 to transmit to the transceiver 10 data for causing the vehicle to speed up or slow down, by changing the status of its powertrain, or to change course, by changing the status of its steering unit. That data may be received by the transceiver 10 and acted on by the vehicle. The transceiver 10 and the pico base stations 3 may also exchange control information for supporting the operation of the wireless link(s) between them.

Figure 2:
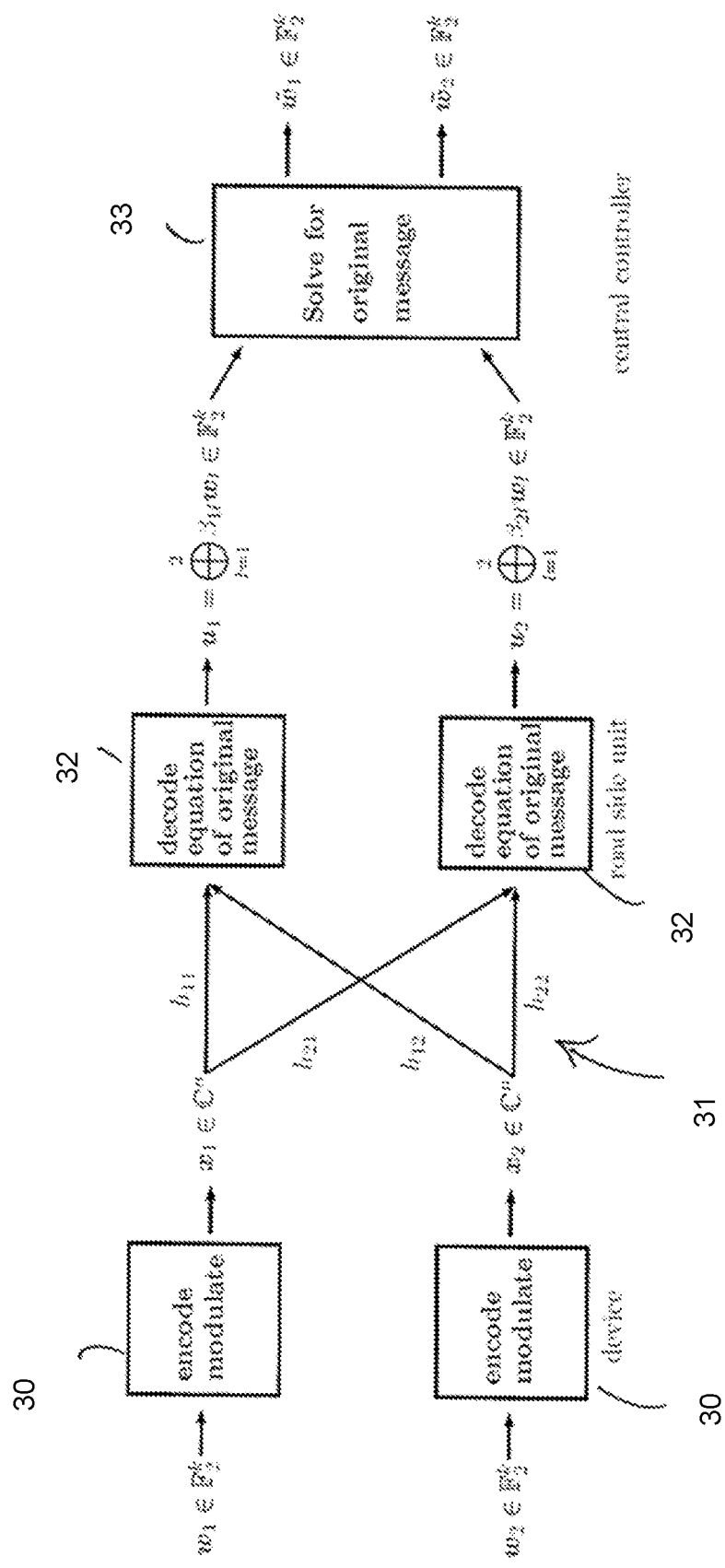
FIG. 2 illustrates the principle of compute and forward relaying.

FIG. 2 illustrates the principle of compute and relay forwarding as it might be implemented in the architecture of FIG. 1. FIG. 2 shows vehicle-borne transceivers 30 (which correspond to transceiver 10), wireless channels 31, roadside transceivers 32 (which correspond to transceivers 3) and a central controller 33 (which corresponds to aggregator 4). The transceivers 30 have raw data $w_1$ and $w_2$ to transmit. They encode and modulate that data to form messages $x_1$ and $x_2$ which are transmitted over the air. The messages can be transmitted simultaneously. A channel with channel coefficients $h_{mn}$ exists between the n-th transmitter and the m-th receiver. The receivers receive signals resulting from the transmissions and decide to obtain representations $u_1$ and $u_2$ of the superposed signals from the transmitters. For the m-th receiver and the case of n transmitters:

$$u_m = \bigoplus_{i=1}^{n} \beta_{mi} w_i$$

where $\beta_{ml}$ is a binary equation coefficient. The representations are then forwarded to the central controller 33. The central controller can attempt to resolve a set of simultaneous ("binary") equations to recover the original messages $w_n$. If the channel code is binary then it is convenient to select a binary equation coefficient. If the channel code is non-binary then the equation coefficient can be selected from the same space as contains the channel code.

A system of this type can permit high throughput because timeslots do not need to be dedicated to individual devices, and low signalling overhead because there is no need to arrange that the vehicle-borne transceivers 30 avoid each other's transmissions. However, in order for the recovery of the original messages to be reliable, the combinations of the transmitted messages to form the representations $u_m$ should be substantially or wholly linearly independent. According to an embodiment, a means to promote this relationship will now be described.

In outline, the process of promoting substantially linearly independent combinations between the transmitted messages is as follows:

A. The central controller 33 gathers channel state information (CSI) for the channels $h_{mn}$. Based on that CSI the central controller 33 determines for each of the intermediate transceivers 32 a candidate set of equation coefficients. The equation coefficients are selected such that the combinations leading to the representations $u_m$ decoded by different intermediate transceivers 32 will be linearly independent, or substantially so: i.e. sufficiently independent that the transmitted signals can be recovered with acceptable reliability.

B. The central controller 33 communicates to each intermediate transceiver 32 the candidate set of equation coefficients that has been determined for it.

C. The n vehicle-borne terminal devices 30 transmit radio signals $x_n$. The transmitted radio signals are superposed at the intermediate transceivers 32 in accordance with the respective channel coefficients $h_{mn}$. Any number of the terminal devices 30 can transmit simultaneously.

D. Each intermediate transceiver 32 selects equation coefficients a to actually use. It may select a single coefficient or one coefficient per terminal device whose data it receives. It selects those coefficients from the candidate equation coefficients communicated to it in step B. As will be discussed in more detail below, it may select those coefficients in dependence on its configuration and/or on information it holds regarding the state of the radio channels. It may select the coefficients that it determines would enable the controller to recover signals at the greatest rate.

E. Each intermediate transceiver 32 decodes a superposition of the transmitted signals as received by it, based on the equation coefficients a selected in step D.

F. Each intermediate transceiver 32 forwards the decoded equations to the central controller 33, together with an indication of the equation coefficients that it selected for use.

G. The central controller 33 uses the complete set of decoded equations and used equation coefficients to estimate the original message data. Because the equation coefficients are selected such that the equations decoded by the intermediate transceiver 32 are at least substantially independent, the original message data can be estimated with acceptable accuracy.

In order to determine sets of candidate equation coefficients in step A, the central controller should have access to CSI on the various wireless channels. The CSI may be collected by one or more of the intermediate transceivers 32 and forwarded to the central controller. The CSI may be collected by one or more of the terminal devices 30 and forwarded via one or more of the intermediate transceivers 32 to the central controller. The CSI may be dependent on information gathered by the central controller concerning the location of the terminal devices 30. The location of a terminal device may be estimated by a locationing unit associated with that terminal device (e.g. carried by the same vehicle). That location may be reported to the central controller via one or more of the intermediate transceivers 32. The location of a terminal device may be estimated by the intermediate transceivers or in other ways. The CSI may also be dependent on data defining the locations of the intermediate transceivers 32. Together with the estimated locations of the terminal devices this may help characterise the potential length and hence the expected performance of each channel. The CSI may be aggregated over time.

The equation coefficients $M_m$ determined in step A for the m-th intermediate transceiver are given by $M_m = \{x \in Z^K : \text{mod}(x, 2) \in B_m\}$ where $B_m \in F_2^K$ and are chosen such that the equations at respective intermediate transceivers will be independent of those at the other intermediate transceivers. In this relationship: K is a dimension corresponding to the number of transmitters, $Z^K$ is the set of all integers of dimension K, x is a vector of length K consisting of those integer numbers, $B_m$ is the set of binary coefficients at intermediate transceiver m and $F_2^K$ is a finite field of order/size 2, with the consequence that $B_m$ is a vector of length K consisting of 0s and 1s.

In step C the terminal devices transmit simultaneously over a common physical and/or logical link. That link can be considered to provide multiple channels between respective transmitters and receivers, as indicated in FIG. 2. For ease of decoding at the intermediate transceivers, it is preferred that each transmitter encodes its signals using the same code rate and/or using the same linear code. It will be appreciated that other systems are possible. For example, one transmitter could encode according to a subset of the encodings available to another transmitter. It should be noted that unlike a slotted ALOHA system there is no need to schedule access to the radio resource by a single transmitter, and unlike a code slotted ALOHA system there is no need to transmit the same message multiple times in order to arrange that it can be recovered.

In step D each intermediate transceiver 32 selects one or a set of equation coefficients a to use. It makes that selection autonomously from the candidate set provided to it in step B. The selection of one or a set of equation coefficients to use may be dependent on the configuration of the respective intermediate transceiver and/or the channel estimation data it currently has. The signal y received by each intermediate transceiver is a linear combination of the transmitted signals x as affected by the respective channel characteristics h (which may be given as real values) and the additive noise z. For the m-th intermediate transceiver, and with n terminal devices transmitting, the received signal $y_m$ is $\Sigma_{i=1}^{n} h_{mi} x_i + z_m$. In principle, selection of coefficients a that will yield linearly independent equations from the different intermediate transceivers will provide a good chance of recovering the original signals. However, it is preferred that the actual coefficients that are used at an intermediate transceiver are selected so as to maximise the computation rate: i.e. the rate at which the linear combinations can be decoded by the central controller. That rate, $R(h_m, a_m)$ is given by:

$$R(h_m, a_m) = \frac{1}{2}\log_2^+\left(\left(\|a_m\|^2 - \frac{P|h_m^H a_m|^2}{1+P\|h_m\|^2}\right)^{-1}\right)$$

where $h_m$ is the channel vector with elements $h_{mi}$ where m is the receiver index, i is the transmitter index and H is the conjugate transpose operator. This can be solved to derive the coefficients a to use. One way to do so is by solving a shortest constrained vector lattice problem in the following manner:

Define $$G_m = (1+P\|h_m\|_2^2)m - Ph_m h_m^H,$$

where $m \in [1, L]$ is the index of the respective intermediate transceiver 31 and $h \in C^n$ is the channel from the n-th terminal device to the i-th intermediate transceiver.

Solve the constrained shortest lattice vector problem: min $a^H G_m a$ subject to the constraint that $a \in M_m$, i.e. that the value a is selected from the set $M_m$ of candidate values provided to the respective intermediate transceiver in step B. a may be constrained to be an integer.

Once the computation rate has been determined at an intermediate transceiver it may be transmitted to one or more of the terminal devices that are to communicate with that transceiver. Such a terminal device may select a rate (e.g. a data rate or symbol rate) for its transmissions in dependence on the rate communicated to it. This may help to maximise the available bandwidth in the system. The terminal device may select its transmission rate in such a way that it does not exceed the computation rate for at least one, for example all of the receivers with which it is in communication.

In step E each intermediate transceiver 32 decodes a superposition of the transmitted signals as received by it, based on the equation selected as described above. Given that a has been selected from the set $M_m$, given that a is an integer, and given that the channel is not constrained, it is likely that the actual channel coefficients h will not match the equation coefficients a. The likelihood of successfully recovering the original message can be improved if the received data is modified to give a closer match to the selected equation coefficients. This can be done by scaling the received signal by a value $a_m$ for the m-th intermediate transceiver 32. For Gaussian noise with variance $\sigma^2$ it can be shown that setting $a_m$ to $$\frac{P}{\sigma^2 + P\|h_m - a_m\|^2}$$

minimises the computation noise. Taking $a_m$ into account, the output of the decoder at the m-th intermediate transceiver can be written as $\tilde{y}_m = \Sigma_n a_{mn} x_n + \Sigma_k (a_m h_{mn} - a_{mn}) x_n + z_m$. In this equation the term $\Sigma_k(a_m h_{mn} - a_{mn}) x_n$ represents the noise due to the approximation of $h_{mn}$ by $a_{mn}$, and may be reduced in magnitude by suitable selection of $a_m$. As noted above, the equation decoded by the m-th intermediate transceiver is given by:

$$u_m = \bigoplus_{i=1}^{n} \beta_{mi} w_i \in F_2^n$$

where $\beta_{mi}$ are binary equation coefficients given by $\beta_{mn} = \mod(a_{mn}, 2)$ and $w_k$ are the original messages as indicated in FIG. 2.

Steps A and B may be repeated on any convenient timescale. For efficiency, it is preferable not to occupy bandwidth and processing time by computing new candidate coefficients and transmitting them to the intermediate transceivers too often. The central controller may store an indication of the CSI at the time the candidate equation coefficients were last calculated. Then from time to time it can compare the current CSI against the stored CSI. In response to the deviation between the two exceeding a predefined threshold the candidate coefficients can be recalculated and retransmitted to the intermediate transceivers. Alternatively, the candidate coefficients can be recalculated from time to time based on the current CSI and then send to the intermediate transceivers if they differ by more than a predetermined threshold from the coefficients currently held by the transceivers. Alternatively, the candidate coefficients can be calculated and sent at predefined time intervals.

Figure 3:
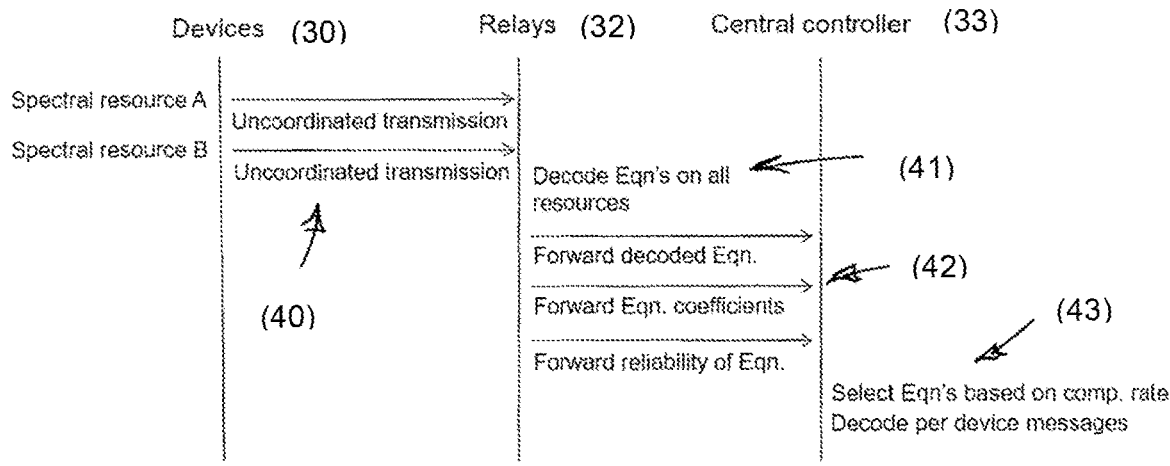
FIG. 3 is a timing diagram for a variant of an embodiment of the invention involving repeated transmissions of particular messages.

In the system as described above, each transmitted message is sent once. The message may be retransmitted on request: for example if it is lost due to interference. FIG. 3 is a timing diagram for communications using a diversity-based variant of the system described above. FIG. 3 shows terminal devices 30, intermediate transceiver relays 32 and the central controller 33. In this system the devices are configured to transmit messages multiple times on different spectral resources (step 40): for example different logical and/or physical channels, and/or at different times. Using principles analogous to those described above, the intermediate transceivers decode those signals (step 41) and represent the signal on each spectral resource by a respective equation. The equations, their equation coefficients and an indication of the reliability of the equation are sent to the central controller (step 42). The reliability indicator may be the computation rate R as discussed above. The central controller chooses which equation to use based on the computation rate (step 43). It may select to use the equation having the greatest computation rate. In this way, the reliability of recovering the original message can be increased over a system in which the message is sent only once.

Figure 4:
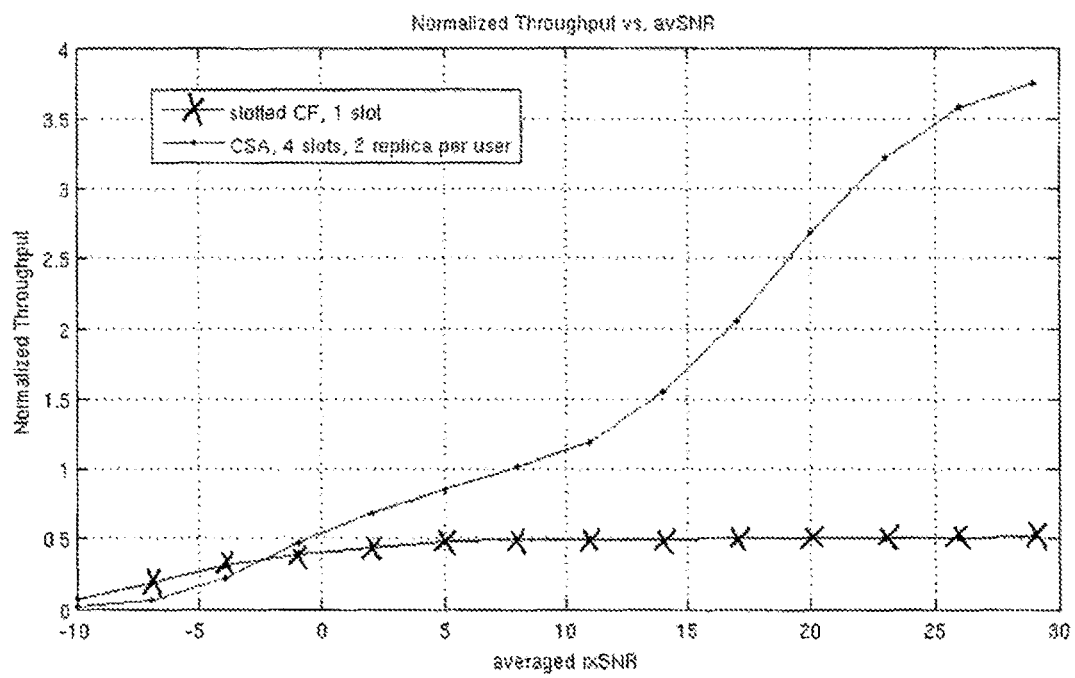
FIG. 4 shows the results of a simulation comparing the system described below with a code slotted ALOHA example system.

FIG. 4 shows a simulation of normalised throughput against average signal to noise ratio (SNR) for a system using the principled described above for an OFDM air interface with four terminal devices and four relays in the topology illustrated in FIG. 1. FIG. 4 indicates that the system using the principle as described above can provide substantially greater throughput than a code slotted ALOHA (CSA) system at higher average SNR levels.

In the systems as described above, processing is split between the intermediate transceivers and the central controller. In practice, functions could be divided between physical and/or logical network elements in any desired way. For example, the central controller could be integrated with an intermediate transceiver.

In the systems as described above, the terminal devices are associated with vehicles. The terminal devices could be devices of other types, for example personal telephones, personal data devices or internet-of-things devices of fixed location.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method for estimating signals transmitted from a plurality of transmitters, the method comprising:
   simultaneously receiving, at each receiver of a plurality of receivers, a respective signal resulting from the transmitted signals;
   determining, for each receiver of the plurality of receivers, a set of equation coefficients;
   forming, for each received signal, a characterisation of the received signal composed of elements weighted in accordance with the set of equation coefficients determined for the receiver at which the received signal was received; and
   processing the characterisations of the received signals to estimate the transmitted signals,
   wherein the set of equation coefficients is determined such that the characterisations of the received signals are substantially linearly independent, and
   wherein at least one receiver of the plurality of receivers receives the transmitted signals and decodes a superposition of the transmitted signals based on one or more equation coefficients selected by the at least one receiver from the set of equation coefficients determined for the at least one receiver of the plurality of receivers, and
   wherein the at least one receiver of the plurality of receivers forwards decoded equations to a controller with an indication of the one or more equation coefficients selected by the at least one receiver of the plurality of receivers.

2. A method as claimed in claim 1, wherein the transmitted signals are transmitted on physical and/or logical channels and the determining step comprises:
   receiving channel information representing the performance of one or more of the channels;
   determining, for each receiver of the plurality of receivers, a candidate set of equation coefficients in dependence on the channel information; and
   selecting, for each receiver of the plurality of receivers, the set of equation coefficients from among the candidate set of equation coefficients.

3. A method as claimed in claim 2, further comprising gathering the channel information at one or more of the plurality of transmitters.

4. A method as claimed in claim 2, further comprising:
   storing an indication of the channel information for a first time;
   receiving channel information for a second time subsequent to the first time;
   estimating an extent of deviation of the channel information received at the second time from the channel information at the first time; and
   determining, in dependence on the extent of deviation, whether to determine, for each receiver of the plurality of receivers, a candidate set of equation coefficients in dependence on the channel information for the second time.

5. A method as claimed in claim 2, wherein the selecting step comprises:
   estimating, for each receiver of the plurality of receivers, a computation rate for two or more of the candidate equation coefficients; and
   selecting the set of equation coefficients for each receiver of the plurality of receivers in dependence on the estimated computation rates.

6. A method as claimed in claim 5, further comprising transmitting an indication of the estimated computation rates to the transmitters.

7. A method as claimed in claim 6, further comprising:
   selecting a data rate for the transmitted signals in dependence on the estimated computation rates; and
   transmitting the transmitted signals at a data rate not exceeding the selected data rate.

8. A method as claimed in claim 5, further comprising selecting, for each receiver of the plurality of receivers, the set of equation coefficients of those determined for the receiver that have the greatest estimated computation rate.

9. A method as claimed in claim 2, wherein the step of determining, for each receiver of the plurality of receivers, a candidate set of equation coefficients is performed at the controller.

10. A method as claimed in claim 9, wherein the step of processing the characterisations to estimate the transmitted signals is performed at the controller.

11. A method as claimed in claim 10, wherein the step of selecting, for each receiver of the plurality of receivers, the set of equation coefficients from among the candidate set of equation coefficients is performed at the respective receiver.

12. A method as claimed in claim 11, further comprising transmitting the selected coefficients to the controller.

13. A method as claimed in claim 12, further comprising:
   determining, for at least one receiver of the plurality of receivers, a set of equation coefficients for each of the multiple channels;
   forming, for each signal received on a respective one of the multiple channels, a characterisation of the received signal composed of factors weighted in accordance with the equation coefficients determined for the respective channel;
   estimating, for each of the multiple channels, a computation rate for the equation coefficients selected for the respective channel;
   selecting the channel of the multiple channels whose equation coefficients yield the highest computation rate;

forming, for the signal received on the selected channel, a characterisation of the received signal based on a weighted combination of the equation coefficients selected for the respective channel; and processing the characterisation of the received signal to estimate the transmitted signal.

14. A method as claimed in claim 13, further comprising:

at the at least one receiver of the plurality of receivers:
(i) forming, for the signals received on each of the multiple channels, a characterisation of the received signals composed of factors weighted in accordance with the equation coefficients determined for the respective channel;
(ii) estimating, for each of the multiple channels, a computation rate for the equation coefficients selected for that the respective channel; and
(iii) transmitting the characterisations and the estimated computation rates to the controller remote from the at least one receiver; and at the controller:
(i) selecting the channel whose equation coefficients yield the highest computation rate; and
(ii) processing the characterisation of the received signal to estimate the transmitted signal.

15. A network element in a communication network comprising a plurality of network elements and a controller, the network element comprising:

a transceiver, configured to:
receive a plurality of transmitted signals; and
receive a candidate set of equation coefficients from the controller; and a processing unit, configured to:
select one or more equation coefficients from the candidate set of equation coefficients; and
decode a superposition of the transmitted signals based on the one or more equation coefficients selected from the candidate set of equation coefficients, wherein the transceiver is further configured to forward decoded equations to the controller with an indication of the selected one or more equation coefficients to enable the controller to estimate the plurality of transmitted signals.

16. A network element acting as a controller in a communication network comprising a plurality of transmitters and a plurality of receivers, the network element comprising:

a processing unit configured to:
determine, for at least one receiver of the plurality of receivers, a set of equation coefficients; and a transceiver configured to:
send, to the at least one receiver of the plurality of receivers, the set of equation coefficients to enable the at least one receiver of the plurality of receivers to decode a superposition of transmitted signals received from the plurality of transmitters based on one or more equation coefficients selected from the set of equation coefficients; and
receive, from the at least one receiver of the plurality of receivers, characterisations of the transmitted signals received at the at least one receiver, the characterisations composed of factors weighted in accordance with the one or more equation coefficients selected at the at least one receiver, wherein the processing unit is further configured to process the characterisations of the transmitted signals to estimate the transmitted signals, and wherein the set of equation coefficients is determined such that the characterisations of the transmitted signals received at the at least one receiver are substantially linearly independent.

17. The network element as claimed in claim 16, wherein the processing unit is further configured to estimate, for the at least one receiver of the plurality of receivers, a computation rate for two or more of the candidate equation coefficients, and to select the set of equation coefficients for the at least one receiver of the plurality of receivers in dependence on the estimated computation rate.

18. The network element as claimed in claim 17, wherein the transceiver is further configured to transmit an indication of the estimated computation rate to the plurality of transmitters.

19. The network element as claimed in claim 17, wherein the processing unit is further configured to select, for the at least one receiver of the plurality of receivers, the set of equation coefficients of those determined for the at least one receiver that have the greatest estimated computation rate.

* * * * *

UNITED STATES PATENT AND TRADEMARK OFFICE
CERTIFICATE OF CORRECTION

PATENT NO. : 10,911,914 B2
APPLICATION NO. : 16/287702
DATED : February 2, 2021
INVENTOR(S) : Zhou et al.

It is certified that error appears in the above-identified patent and that said Letters Patent is hereby corrected as shown below:

On the Title Page

Under item (56), Other Publications, Line 1: "vol.11, No. 9, XP011463440" should read -- vol. 11, No. 9, XP011463440 --.

In the Claims

Claim 14, Column 11, Line 17: "for that the respective" should be -- for the respective --.

Signed and Sealed this
Twelfth Day of July, 2022

Katherine Kelly Vidal
*Director of the United States Patent and Trademark Office*